United States Patent [19]

Cribb et al.

[11] 4,355,208
[45] Oct. 19, 1982

[54] TELEPHONE CALL DENIAL SYSTEM

[75] Inventors: John A. Cribb, Ottawa; John R. Whitbread, Ashton; Graham Neathway, Ottawa; Robert A. Durance, Kanata, all of Canada

[73] Assignee: Mitel Corporation, Kanata, Canada

[21] Appl. No.: 204,151

[22] Filed: Nov. 5, 1980

[30] Foreign Application Priority Data

Aug. 27, 1980 [CA] Canada ..................... 359108

[51] Int. Cl.³ .................. H04M 1/66; H04M 3/38
[52] U.S. Cl. ..................... 179/18 DA; 179/18 FH
[58] Field of Search .......... 179/18 DA, 18 D, 18 FH, 179/27 CB, 27 DB

[56] References Cited

U.S. PATENT DOCUMENTS

| | | | |
|---|---|---|---|
| 3,151,219 | 9/1964 | Ellis et al. | 179/18 FH |
| 3,267,216 | 8/1966 | Raab et al. | 179/7.1 TP |
| 3,471,647 | 10/1969 | Abert et al. | 179/18 FH |
| 3,521,001 | 7/1970 | Pearce et al. | 179/18 FH |
| 3,787,632 | 1/1974 | Male et al. | 179/18 FH |
| 4,027,104 | 5/1977 | Levitt et al. | 179/7 R |

FOREIGN PATENT DOCUMENTS 1551826  9/1979  United Kingdom ........... 179/18 FH

Primary Examiner—Thomas W. Brown
Attorney, Agent, or Firm—Laff, Whitesel, Conte & Saret

[57] ABSTRACT

A call denial apparatus for identifying a telephone subscriber's line out of a group, whereby access to a trunk is denied in the event the subscriber dials one or a group of predetermined digits. A subscriber not to be denied access to the trunk is identified by applying a tracer signal to the seized trunk and the tracer signal on one of the group of subscribers' lines is detected. Accordingly specially modified telephone sets and lines are not required.

11 Claims, 6 Drawing Figures

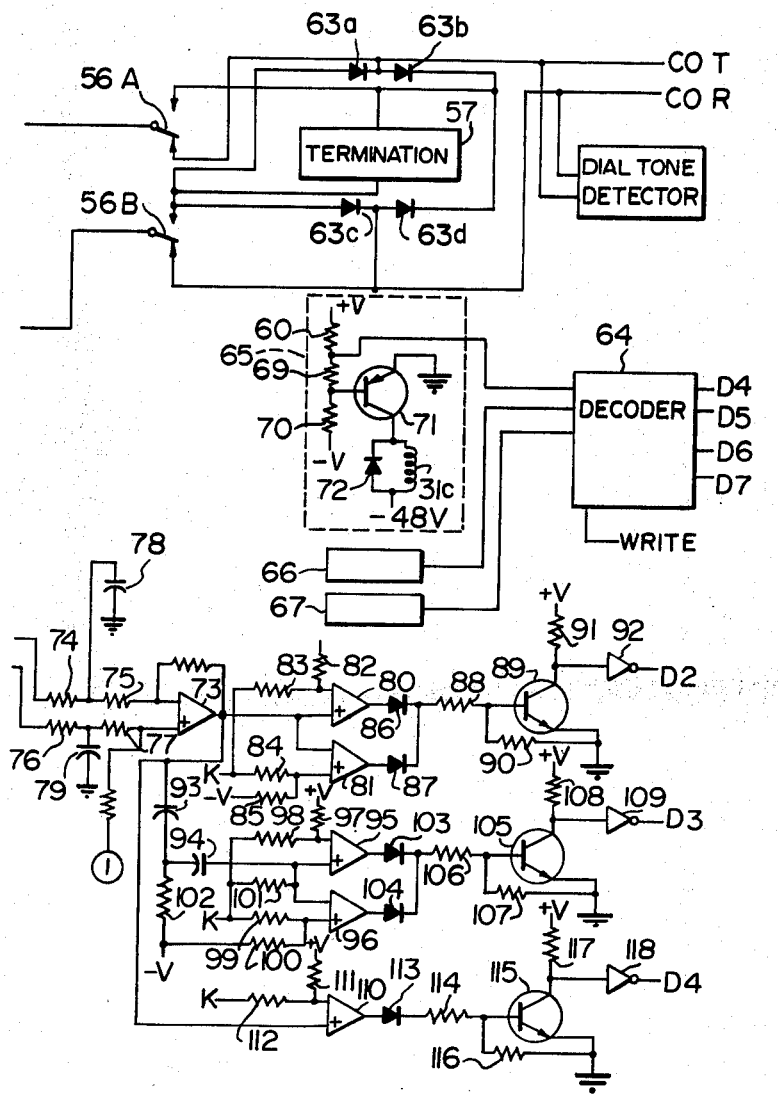

TELEPHONE CALL DENIAL SYSTEM

INTRODUCTION

This invention relates to call restriction apparatus for telephone systems, and particularly to such apparatus which can be used in conjunction with a PABX.

It is often desirable to restrict certain station sets connected to a PABX from making unauthorized toll calls, or from gaining access to certain trunk-interfaced facilities. Yet at the same time it is desirable to give some station sets access to trunks leading to a central office. Toll restriction apparatus has previously determined whether a call should be restricted or not based on the detection of particular digits dialled at the restricted station sets, or upon recognition of predetermined numbers of digits, to terminate further processing of the call.

BRIEF DESCRIPTION OF THE PRIOR ART

In U.S. Pat. No. 4,000,380 issued Dec. 28, 1976, invented by J. M. Jackson, an apparatus is described which utilizes a circuit interconnected with the internal circuitry of each telephone set which is to be restricted. The apparatus counts the number of digits and upon counting a predetermined number of digits (which is evidence of a toll or outgoing call), prevents the transmission of additional digits. Since each restricted telephone set must be modified, extraordinary care must be taken before station sets are interchanged between employees, and special record keeping is required to keep track of the station sets. Both standard and non-standard telephone sets must also be manufactured and stocked. This system also does not distinguish between destinations of calls allowed or restricted from a particular telephone set, since only the number of digits are counted. Clearly this system introduces substantially increased costs and has minimal flexibility.

Another call denial circuit is described in U.S. Pat. No. 3,996,425, issued Dec. 7, 1976, to A. E. Low and M. J. Sturtevant. This system is used in association with a PABX and utilizes a common check circuit and a plurality of digit registers which are individually associated with particular lines to record calling data. The invention is directed to means for providing a multifrequency facility to circuitry which could previously detect rotary dialled digits. However a circuit must still be used associated with each line connected to the PABX. Further the system is interconnected with a particular type of PABX, since it interacts with the PABX common control. Intimate knowledge of the PABX circuitry must therefore be available in order to implement that system.

The present invention, on the other hand, is a call denial circuit which can be used with a PABX of unknown design, or with any switching network in which a plurality of lines have access to a plurality of trunks. The present circuit is connected only to the trunks and to the lines themselves. The number of circuits required are related to the number of trunks, rather than the number of lines, which substantially decreases the amount and complexity of the equipment, since the number of trunks is substantially smaller than the number of lines.

There are three problems of interest associated with call restriction: (a) determination of which telephone set is making the call, (b) determination of what trunk is utilized, and (c) determination of the destination of the call, as by the dialled digits, whereby restriction can be effected.

In U.S. Pat. No. 4,000,380, the problems of identifying the station set and outgoing trunk are solved by associating the restriction apparatus with each telephone set. A rudimentary identification of a restricted number is made by counting the number of digits dialled.

In U.S. Pat. No. 3,996,425, the identity of the restricted telephone set and outgoing trunk are established by the PABX itself. A special memory associated with the PABX identifies restricted numbers.

SUMMARY OF THE INVENTION

In the present invention, a unique method of identifying the trunk or destination path, and the station set having access thereto, is utilized, which results in substantial savings and increased flexibility. Identity of the restricted number can then be performed by known methods such as by storing a restricted digit or series of digits in a microprocessor memory, comparing a dialled digit or digits with the restricted number, and if a match is found, dropping the trunk in the event that an acceptable station set has not been identified.

The invention in general is a call denial apparatus for use in a telephone system having a plurality of subscribers' lines and at least one trunk comprising a circuit for detecting seizure of a trunk, and a circuit for applying a tracer signal to the trunk upon detection of its seizure. A detection circuit detects the tracer signal on one of a plurality of subscribers' lines which have undenied access to the trunk. A dialled digit or digits carried by the trunk is registered, and compared with a predetermined stored digit or digits. A splitting circuit then open circuits (i.e. drops) the trunk in the event of both no detection of the tracer signal (a subscriber not connected for tracer detection) and the matching of the dialled digits with the predetermined digits, whereby a subscriber's line connected to the trunk is denied further access to the split-off portion of the trunk.

Since no knowledge of the interconnection path between the subscriber's line and trunk (in a PABX, for example) need be known, the tracer signal establishes if a no-denial station set is connected to the trunk which is seized. A digit receiver (which can be shared with other such circuits) is connected to the trunk, detects the dialled digits, and applies them to a data bus to which a similarly shared microprocessor is connected. If the dialled digits match one or a group of digits stored in a memory, and if the tracer signal has been detected, the microprocessor or other control circuitry issues a control signal to split the trunk. The trunk which had been seized from the PABX to a central office is thus released.

BRIEF INTRODUCTION TO THE DRAWINGS

A better understanding of the invention will be obtained by reference to the detailed description below, and to the following drawings, in which:

FIGS. 2A, 2B, 3 and 4 are schematic diagrams of block portions of the invention shown in FIG. 1, FIG. 2C being an assembly drawing for FIGS. 2A and 2B.

DESCRIPTION OF THE PREFERRED EMBODIMENT

The following description is of an apparatus which includes both the invention and ancilliary circuits, and utilizes a microprocessor. The function of the microprocessor is described in sufficient detail to allow a person skilled in the art to prepare an operation program. However as neither the microprocessor nor its program are the subject of this invention, and since the principles of the microprocessor and its programming are well known, a detailed description thereof is believed to be redundant to a person seeking an understanding of the present invention and will not be detailed.

Figure 1:
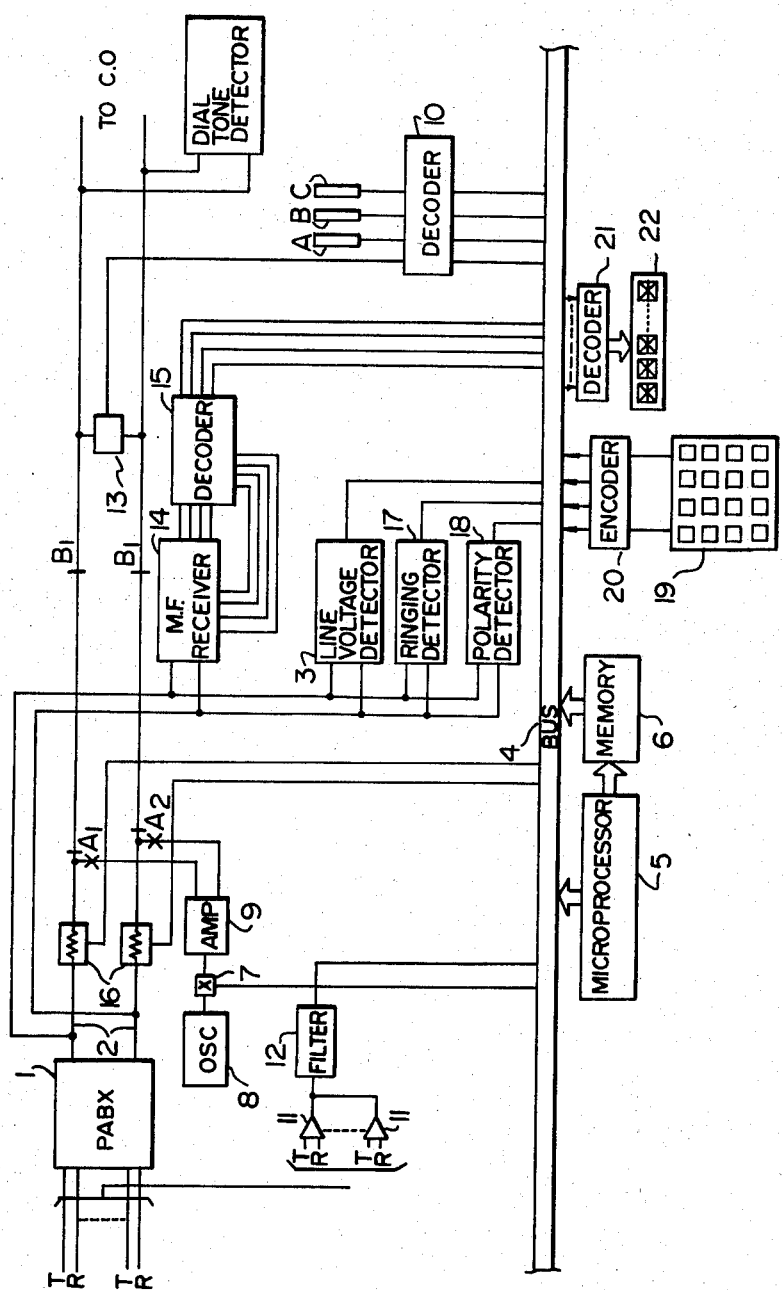
FIG. 1 is a block schematic of the preferred embodiment of the invention.

Turning first to FIG. 1, which is a block schematic of the invention, the PABX 1 to which the invention is be connected which can be of standard and known construction, such as type SX-200 TM, sold by Mitel Corporation of Kanata, Canada. The PABX has at least one trunk 2, and a plurality of subscribers' lines T,R connected thereto. The PABX interconnects any of the subscribers' lines to another, or to one of the trunks. The trunk shown connects to a central office C.O. but can alternatively be connected to a special service circuit such as a conferencing circuit, etc.

A pair of line current detectors 16 are connected to the trunk 2, and are adapted to detect seizure of the trunk. Upon detection of the seizure, they apply a binary data signal to a data bus 4. Data bus 4 is accessed by microprocessor 5 and memory 6.

Upon the microprocessor recognizing that the trunk has been seized, it applies a signal to data bus 4 which is decoded in decoder 10, and which causes the operation of relay A.

Relay A, in closing, causes operation of transfer contacts $A_1$ and $A_2$. This splits the trunk into an originating portion connected to the PABX and a central office portion which leads to the central office.

Upon splitting of the trunk and the operation of switch 7, a 3170 hz. tracer signal is applied to the originating portion of the trunk, passing back through the PABX to the subscriber's line which is connected to the trunk via the PABX. This is applied by the microprocessor closing an electronic switch 7 which is in the transmission path between the output of a tracer signal generator (oscillator 8) and a buffer amplifier 9. In a successful prototype of this invention, oscillator 8 operated at 3170 hertz.

Each of the undenied subscriber's line pairs T,R is connected via a corresponding buffer 11 to the input of a tracer signal bandpass filter 12 which has a digital output. Upon reception of the tracer signal, which passes through filter 12, the binary output signal of filter 12 is applied to data bus 4. The microprocessor, upon reading the output signal from filter 12, recognizes the tracer signal received. It then applies binary signals to data bus 4 to release relay A, reestablishing the connection of the trunk from the PABX to the central office, and opening switch 7.

Just prior to splitting the trunk, the microprocessor also applies a data word to decoder 10 which causes operation of trunk hold circuit 13. This circuit closes a switch in series with a resistor across the central office portion of the trunk, of value about 300 ohms, to load and hold the trunk to the central office. When the A relay is released, reclosing the trunk, the hold circuit 13 is also released, unloading the trunk.

A multifrequency tone signalling receiver 14 has its inputs connected to the originating portion of the trunk. The subscriber keys in the desired destination number, and this is transmitted via the trunk to the central office and is also detected in receiver 14. The outputs of receiver 14 are connected to the inputs of a decoder 15, which generates a binary signal corresponding to the keyed digits and applies it to data bus 4.

Should the subscriber set utilize dial pulses, these are detected by current detectors 16 and line voltage detector 3, connected to trunk 2. The current detectors 16 are comprised of low resistance (such as 39 ohms) resistors connected in series with each trunk lead. A transistor circuit detects voltage changes across each resistor, and generates corresponding binary signals which are applied to data bus 4. A suitable circuit for the detector 16 is described in U.S. patent application No. 119,900, filed Feb. 8, 1980, entitled DIAL PULSE DETECTION CIRCUIT, invented by Brian Pascas and Brian Vaughan now U.S. Pat. No. 4,326,105, issued Apr. 20, 1982. Dial pulse detectors are well known, and any one which can apply suitable signals to the microprocessor can be used.

The resulting keyed or dialled digits are received by microprocessor 5, which compares the digits with a look-up table in memory 6. If the dialled digits correspond to a number stored in memory 6, microprocessor 5 applies a binary signal to data bus 4, which is decoded in decoder 10, which operates relay B. Relay B splits the trunk by opening contacts $B_1$ in series therewith, which denies further access of the subscriber to the central office portion of the trunk. At the same time the central office portion of the trunk to the central office is released.

As a further feature, the design can have microprocessor 5 operate relay A and switch 7, and as well as a switch within oscillator 8 (not shown) which causes generation of a tone frequency (diversion tone) different from that of the tracer signal, which different frequency is heard by the subscriber and indicates to him that a forbidden sequence of numbers has been dialled, and that the call proceedings have been terminated. In an alternative, a diversion tone is provided from a different source, when the trunk is split, in a manner to be described in more detail later.

It may be recognized that relays A and B both act to split the trunk, which would appear to make relay B redundant. However it is preferred that two such relays should be used since oscillator 8, switch 7, and amplifier 9 can be shared by a plurality of trunks. Relay contacts similar to the $A_1$ contacts connected to other A relays are in this case connected to the output of amplifier 9. Relay A therefore should preferably remain operated only during the application of a short burst of tracer signal to the trunk, and thus an additional B relay which can remain operated for relatively long periods of time should be used for the actual denial trunk split function.

Where it is desired to provide restricted access by a subscriber's line to the trunk, with denial feature, that subscriber's line appearance merely need not be connected to a buffer 11. Upon application of the tracer signal to a trunk which has been seized and is connected to that subscriber's line, the tracer signal will be detected, and consequently subsequently dialled digits will be compared in the memory look-up table, and the trunk will optionally be split. It therefore becomes a simple matter to apply the allow feature to a subscriber's line merely by connecting the input of a buffer 11 to a subscriber's line appearance at the PABX. No modification to the station set need be made, and great flexibility and ease of interchangeability of the denial feature between station sets are thus afforded.

It should be noted that although the tracer signal is described as allowing subscribers access to a trunk, it could obviously be used alternatively to deny such access. Tracer signal allowance would normally be used where there are fewer subscribers allowed access than denied. In addition, detection of the tracer signal to identify privileged subscribers' sets reduces the possibility of cheating the system.

The tracer signal thus effectively becomes a class of service indicator. Since the look-up table in memory 6 can store as many digits as desired, the circuit can provide a denial on either one or a sequence of predetermined dialled digits.

It should also be noted that relay B, rather than operating break contact $B_1$ in series with the trunk, can instead operate a pair of transfer contacts which both breaks the trunk and transfers the originating portion to a diversion trunk, which can carry a recorded message, a tone, or the like.

During a normal operation of the trunk, ringing current can of course appear on the trunk from the central office which is directed to the PABX. A ringing current or voltage detector 17 is also connected across the trunk, and provides a binary signal to data bus 4 for reception by microprocessor 5 upon detection of ringing. Upon detection of ringing, and seizure of the trunk, the microprocessor is inhibited upon receipt of the noted binary signal from causing operation of relays A or B which would otherwise split the trunk for this incoming type of call.

As an additional feature a polarity detector 18 can be connected across the trunk, which detects seizure by polarity reversal. When the trunk has first been split by relay A, it is held seized to the central office by operation of hold circuit 13. At the same time the microprocessor causes operation of relay C by applying a word to data bus 4 which is decoded in decoder 10. The contacts of relay C provide a battery polarity reversal in the trunk hold circuit 13, in a well known manner.

The look-up table in memory 6 can be established by the use of a key pad 19, interfacing with binary encoder 20 which has its output connected to data bus 4. A binary decoder 21 has its inputs connected to data bus 4, and its outputs to a digital display 22. Programming of the microprocessor utilizing a key pad and encoder, and displaying the data words applied thereto using a decoder and display are well known, and would be redundant explanation to a person skilled in the art.

Figures 3, 4:
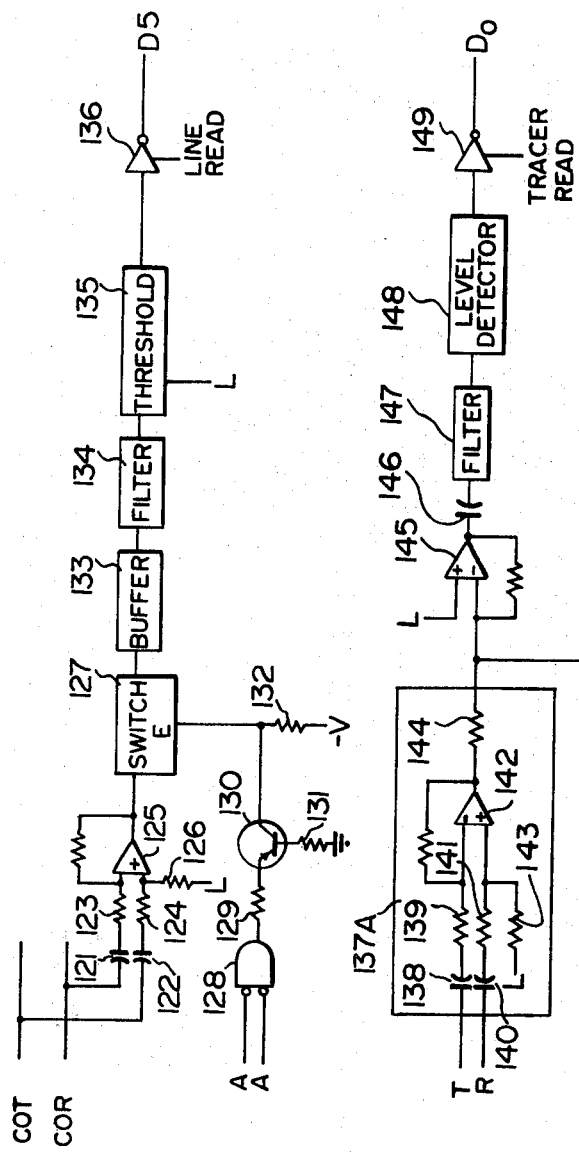

It was noted that the tracer signal can also be considered to be a "class of service" signal which is detected by the tracer signal detector (described in detail in FIG. 4). If different classes of service are to be allocated to different subscribers, by which the microprocessor causes different numbers or groups to be denied, or different functions to be performed, different tracer signal frequencies can be generated, enabled by the microprocessor, and detected in tracer signal detection circuits having filters with different passband frequencies, which apply different binary signals to the microprocessor.

Figure 2A:
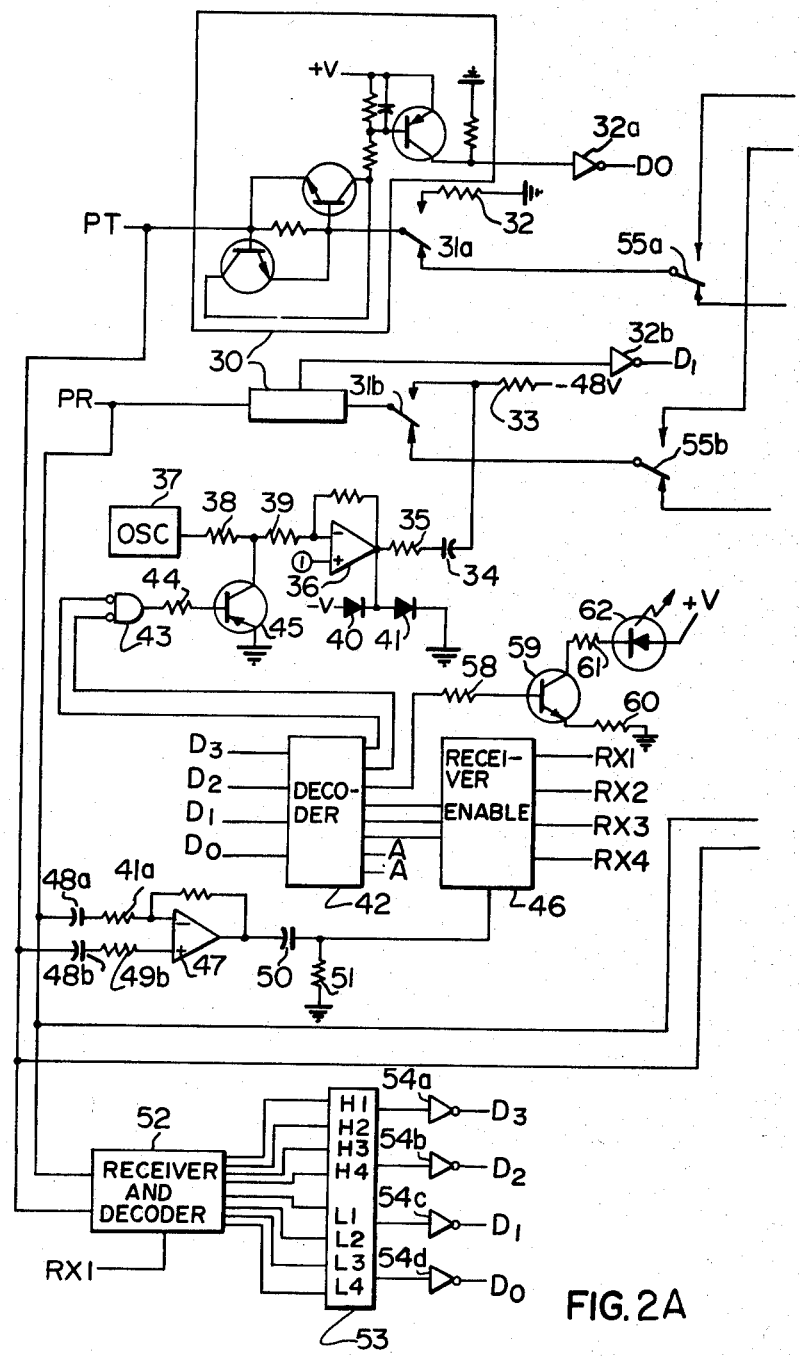

Turning now to FIGS. 2, 3 and 4, the invention is shown in more detail. It is assumed that a person skilled in the art has sufficient knowledge of microprocessor circuitry techniques and programming sufficient to be able to derive the circuit described below. It is preferred that the microprocessor should be type 6802, available from MOTOROLA, INC. of the United States, and memory 6 should be appropriate interfacing ROMs and RAMs. A full description of the operation of such circuitry is available from Motorola Inc., and also may be found in the publication *MICROCOMPUTER PRIMER* by M. Waite and M. Pardee, published by Howard M. Sams & Co., Inc. of Indianapolis, Ind., U.S.A.

In the Figures described below, it is assumed that the system utilizes an eight parallel bit data bus, labelled D0–D7. While the data bus leads are shown, the address bus, clock source, power supply, enable leads, etc., are not shown, since their structure are believed to be within the normal skill of the microprocessor designer.

The trunk leads 2 connected to PABX 1 (FIG. 1) labelled PT and PR are connected through a dial pulse detection circuit 30 to trunk splitting transfer contacts 31a and 31b. These contacts are part of a relay which also includes relay coil 31c (see block 65). The output of the dial pulse detection circuit is connected via inverting buffers 32a and 32b to data bus leads D0 and D1 respectively.

The dial pulse detection circuit 30 can be any which is well known, or the one which is described in the aforenoted patent application describing the invention DIAL PULSE DETECTION CIRCUIT, invented by Brian Pascas and Brian Vaughan.

The break contacts of the relay contacts 31a and 31b are normally closed, connecting the PABX portion through to the central office portion of the trunk. The make contact portions are connected on the tip side of the trunk via resistor 32 to ground, and on the ring side via resistor 33 to a source of potential −48 V. Accordingly when relay 31 operates, −48 V and ground are extended through the tip and ring leads respectively to the PABX, in place of the same potential applied at the central office once the trunk has been seized.

The make contact pair of contacts 31b is also connected through isolation capacitor 34 and resistor 35 to the output of a buffer amplifier circuit 36, the input of which is connected to oscillator 37 via series resistors 38 and 39. The output of amplifier circuit 36 is also connected to an amplitude clipper comprising series diodes 40 and 41 connected in the same polarity sense between potential −V (connected to the anode of diode 40) and ground.

Data bus leads D0, D1, D2 and D3 are connected to the input of binary decoder 42. A pair of outputs of the decoder are connected to inverting AND gate 43, the output of which is connected through resistor 44 to the base of transistor 45. The emitter of transistor 45 is connected to ground and its collector is connected to the junction of resistors 38 and 39.

Other outputs of decoder 42 are connected to a receiver enable driver 46, the outputs of which are connected to the enable inputs of a plurality of multifrequency tone receivers (not shown) on leads RX1, RX2, RX3, RX4 etc. Driver 46 is adapted to select an idle receiver. Multifrequency dialled digit tones are received from the PABX portion of the trunk via operational amplifier 47 which has its inputs connected via capacitors 48a and 48b respectively in series with resistors 49a and 49b connected to the PT and PR leads. The output of operational amplifier 47 is connected through capacitor 50 bypassed by resistor 51 to ground, to the tone input of driver 46.

In the alternative to the selection of an idle receiver, a dedicated receiver can be used. In this case a receiver and decoder 52 is connected as shown to the trunk leads PT and PR. The outputs of receiver and decoder 52, which are four leads carrying well known and standard dialing M.F. high tone frequencies, H1, H2, H3 and H4, and four leads carrying the corresponding well known and standard low tone frequencies, L1, L2, L3 and L4 are connected to encoder 53. The outputs of encoder 53 are connected via inverting buffers 54a, 54b, 54c and 54d respectively to bus leads D0–D3. A circuit which provides these functions is as described in U.S. Pat. No. 4,273,965, entitled Tone Decoder, invented by Patrick R. Beirne and Michael C. J. Cowpland, issued June 16, 1981. However other receivers and decoders can be used.

The break contacts of contacts 31a and 31b are connected to the transfer contacts of relay contacts 55a and 55b. The latter contacts provide the main trunk splitting function. Their make contacts can be connected to a diversion trunk labelled DIVT and DIVR if desired, for application of a diversion tone, a recorded announcement, etc.

The break contacts of contacts 55a and 55b are connected to the transfer contacts of a further set of contacts 56a and 56b. The break contacts are connected to the portion of the trunk leading to the central office, labelled as leads COT and COR. The make contacts are connected to a termination impedance 57, which is preferably optocoupler controlled as will be described below (but which can be reed relay or otherwise controlled), and contains the phototransistor (not shown) of the optocoupler.

An additional output of decoder 42 is connected via resistor 58 to the base of the optocoupler driver transistor 59. The emitter of this transistor is connected through bias resistor 60 to ground, and the collector is connected through resistor 61 to one terminal of light emitting diode 62 of the optocoupler, the other terminal of which is connected to a source of potential +V. Light emitting diode 62 is coupled to a phototransistor used in terminating impedance 57 to form the optocoupler.

A bridge rectifier comprising diodes 63a, 63b, 63c and 63d is connected across the central office portion of the trunk, leads COT and COR. The termination impedance is connected across the bridge rectifier, deriving power therefrom; it is preferred that the terminating impedance should be active. The terminating impedance is enabled by means of the aforenoted optocoupler.

The make contacts of contacts 56a and 56b are connected across impedance 57.

A decoder 64 has its inputs connected to bus leads D4, D5, D6 and D7, and to the write enable lead of the microprocessor. Its outputs are connected respectively to relay driver circuits 65, 66 and 67. As an example of the relay driver circuit, driver 65 is shown in detail.

An output of decoder 64 is connected to the junction of two of the three series connected resistors 68, 69 and 70 connected between sources of potential +V and −V. The junction between resistors 69 and 70 are connected to the base of transistor 71, which has its emitter connected to ground. The collector of transistor 71 is connected through relay coil 31c to source of potential −48 V. A protective diode 72 is connected across relay coil 31c. As was noted earlier, relay coil 31c operates contacts 31a and 31b.

A similar relay coil in relay driver 66 operates contacts 55a and 55b, and a similar relay coil in driver 67 operates contacts 56a and 56b.

Also connected to the trunk tip and ring leads PT and PR are a line voltage detector and a ringing voltage detector, and, if desired, a line voltage polarity detector. These detectors are connected to the tip and ring leads PT and PR through a buffer amplifier circuit 73 which has its inputs respectively D.C. coupled to these tip and ring leads through resistors 74 and 75 in series, and 76 and 77 in series. The junction between resistors 74 and 75 is bypassed to ground by capacitor 78, and the junction between resistors 76 and 77 is bypassed to ground by capacitor 79.

The output of operational amplifier 73 is connected to the line voltage detector, in particular to the non-inverting input of operational amplifier 80 and the inverting input of operational amplifier 81. The inverting input of operational amplifier 80 is connected to the junction of a pair of series connected resistors 82 and 83 which are connected between a source of potential +V and a source of reference potential K. The inverting input of operational amplifier 81 is connected to the junction of a pair of series connected resistors 84 and 85 which are connected between a source of potential −V and reference potential K.

The outputs of operational amplifiers 80 and 81 are connected together through buffer diodes 86 and 87. Their junction is connected through resistor 88 to the base of transistor 89 which has its emitter connected to ground (its emitter-base junction bypassed by biasing resistor 90) and which has its collector connected to a source of potential +V through resistor 91. Its collector is connected through inverting buffer 92 to data bus lead D2.

The output of operational amplifier 73 is also connected to a ringing voltage detector through coupling capacitor 93. This capacitor is connected through a further coupling capacitor 94 to the non-inverting input of operational amplifier 95 and to the inverting input of operational amplifier 96. The inverting input of operational amplifier 95 is connected to the junction of a pair of series connected resistors 97 and 98 which is connected between a source of potential +V and a reference potential K. Similarly the non-inverting input of operational amplifier 96 is connected to the junction of series connected resistors 99 and 100, which circuit is connected between the source of potential −V and reference potential K. The non-inverting input of operational amplifier 95 and the inverting input of operational amplifier 96 are connected to the reference potential K via resistor 101. The junction between capacitors 93 and 94 is connected to source of potential −V through resistor 102.

The output of operational amplifiers 95 and 96 are connected together through buffer diodes 103 and 104, and their junction is connected to the base of transistor 105 through resistor 106. The emitter of transistor 105 is connected to ground, and the base is connected to the emitter through biasing resistor 107. Its collector is connected to source of potential +V through resistor 108, and to data bus lead D3 through inverting buffer 109.

The polarity detector is also connected to the output of operational amplifier 73, via a direct connection to the non-inverting input of operational amplifier 110. Its inverting input is connected to the junction of a pair of series connected resistors 111 and 112 which are connected between a source of potential +V and reference potential point K. The output of operational amplifier 110 is connected through diode 113 in series with resistor 114 to the base of transistor 115. The emitter of transistor 115 is connected to ground, and its base is connected to its emitter through resistor 116. Its collector is connected to source of potential +V through inverting resistor 117 and to data bus D4 through buffer 118.

To obtain an indication that the central office has in fact responded to the seizure of the trunk from the PABX, a dial tone detector, for detecting dial tone extended back to the PBX from the central office, is also connected to the central office portion of the trunk, and is shown in FIG. 3. If required, a loop to ground start interface should be used, as described in U.S. Pat. No. 4,221,936 issued Sept. 9, 1980, entitled LOOP TO GROUND START CIRCUIT, invented by Brian Pascas, or other known loop to ground interface circuits.

The central office portion of the trunk, leads COT and COR are connected via isolation capacitors 121 and 122 respectively in series with resistors 123 and 124 to the inputs of operational amplifier 125. The inverting input is connected via resistor 126 to a source of balancing potential L. The output of operational amplifier 125 is connected to the input of a CMOS switch 127.

A pair of outputs A—A of decoder 42 (FIG. 2) is connected to corresponding inputs of inverting AND gate 128. The output of AND gate 128 is connected through resistor 129 to the emitter of transistor 130, the base of which is connected through resistor 131 to ground. The collector of transistor 130 is connected to the enable input of CMOS switch 127, and through resistor 132 to source of potential −V.

The output of switch 127 is connected through a buffer 133 to the input of a dial tone bandpass filter 134. The output of filter 134 is connected through a threshold detector 135 in series with a buffer 136 to data bus leads D5. Buffer 133, filter 134, and threshold detector 136 are all of conventional construction; a reference potential L for establishing the threshold level is connected to threshold detector 135.

The tracer signal detector, or line identifier is shown in FIG. 4. The tip and ring leads T and R of each of the subscribers' lines connected to the PABX (see FIG. 1) are connected to respective buffer circuits 137A, 137B . . . 137N. For the sake of clarity the circuitry within only one of the representative buffer circuits, 137A, is shown.

The tip and ring leads are respectively connected via capacitor 138 in series with resistor 139, and capacitor 140 in series with resistor 141 to corresponding inputs of operational amplifier 142. The non-inverting input of operational amplifier 142 is connected to a source of balancing potential L through resistor 143.

The output of operational amplifier 142 is connected via resistor 144 to the inverting input of operational amplifier 145. The non-inverting input is connected to a source of balancing potential L. Similarly all of the outputs of buffer circuits 137A–137N are connected together to the inverting input of amplifier 145, which itself forms a buffer input to the following circuitry.

The output of amplifier 145 is connected via coupling capacitor 146 to the input of tracer signal bandpass filter 147. The output of amplifier 147 is connected to a level detector circuit 148, the output of which is connected via inverting buffer 149 to data bus lead D0.

The enable input of buffers 136 and 149 (which preferably are in the form of tri-state gates) are respectively connected to a line read and a tracer read output lead from the microprocessor.

Filter 147 is of conventional construction as is the level detector circuit 148. Filter 147 can be a 3170 Hz. gyrator type bandpass filter for passing the preferred 3170 Hz. tracer signal from oscillator 8. This relatively high frequency was chosen to avoid the interfering effects of other signals on the line which are present at the input of the receiver, i.e. speech, ringing, dialling, on-off hook signals, etc. The receiver is carefully designed to receive only the tracer signal and reject other signals.

Operation of the circuit will now be described. Reference is made to FIGS. 2, 3 and 4 together. The microprocessor and memory referred to is that described earlier with reference to FIG. 1.

When a subscriber goes off-hook, and accesses a trunk to the central office, the trunk is seized in the normal manner. Line current appears from the central office on the PT and PR leads, which is detected in the D.C. line current detectors 30. High level signals are placed on the data bus via inverting buffers 32A and 32B and leads D0 and D1. These signals are received by the microprocessor, generating an interrupt.

The microprocessor in response applies a signal to data bus leads D0–D3, which is decoded in decoder 42, addressed to transistor 59. As a result the LED 62 operates in the optocoupler connected in impedance 57. The impedance provides a shunt across the COT and COR leads, maintaining the central office portion of the trunk seized from the point of view of the central office.

The microprocessor also applies a signal to data bus leads D4–D7 which is addressed to operate relay coil 31c. The signal is decoded in decoder 64, and a resulting low level voltage is applied to the junction between resistor 68 and 69 when a write signal from the microprocessor appears on the write lead of decoder 64. As a result, transistor 71 conducts, operating relay coil 31c. Contacts 31a and 31b operate, maintaining −48 volts and ground on the PR and PT leads (which was previously extended from the central office upon seizure of the trunk), and also connecting the tracer signal oscillator circuit to the PR lead.

The microprocessor next applies a signal to data bus leads D0–D3 addressed to the tracer signal oscillator switch. Decoder 42 decodes the signal, and applies it via inverting AND gate 43 to transistor switch 45. Transistor switch 45, which previously had its emitter-collector circuit conducting, now ceases conduction, removing the effective short circuit of the junction of resistors 38 and 39 from ground. The 3170 Hz. signal from oscillator 37, is now applied to operational amplifier 36. The 3170 Hz. tracer signal is thus applied to the PR lead via make contact 31b, and returns to ground through make contact 31a and resistor 32.

The tracer signal passes through the PABX to the tip and ring leads of the telephone set which had seized the trunk. The tracer signal thus is applied to the input of operational amplifier 142 (FIG. 4), or another similar buffer circuit 137b–137n connected to tip and ring leads which receive the tracer signal. The resulting output signal is applied through amplifier 145 to tracer signal filter 147, which passes the 3170 Hz. signal. The resulting output signal from filter 147 is applied through level detector circuit 148, inverting buffer 149 to the D0 lead of the data bus. It is preferred that buffer 149 should be a tri-state gate. Level detector circuits which will operate as circuit 148 are well known and preferably has a variable threshold. The threshold is established and preset depending on the normal amplitude of the tracer signal received thereby from the tip and ring leads, and will in part be dependent on the transmission path loss within the PABX. The output signal on the D0 lead is applied upon reception of a "tracer read" signal at the enable gate of inverting buffer 149 from the microprocessor.

The microprocessor then shuts off the tracer signal by addressing transistor 45 through decoder 42, causing the transistor to begin conduction, connecting the output of oscillator 37 to ground through resistor 38, and also addressing transistor 71, causing release of relay 31c, reconnecting the break contacts 31a and 31b. The trunk conduction path thus becomes continuous again from leads PT and PR to leads COT and COR. Impedance 57 is also made high impedance controlled by a signal addressed from the microprocessor to transistor 59. The subscriber then dials in digits either by keying multifrequency tones or by generating dial pulses. Should the tracer signal have been detected, these dial pulses are ignored by the circuit, and the call proceeds as a normal outgoing call.

If the tracer signal had not been detected, however, the following dialled digits are monitored by the circuit. Assuming that dial pulses are received, the current detectors 30, functioning as dial pulse detection circuitry in conjunction with a line voltage detector detects the pulses and applies them as signals to the D0, D1 and D2 data bus leads for reception by the microprocessor.

The line voltage detector is comprised of differential amplifier 73, and a threshold circuit comprising differential amplifiers 80 and 81. The threshold of line voltage detection is established by the potential K, which can be set at a reliable indication level, depending on the line. Where the potential $-V$ is $-12$ volts, and $+V$ is $+5$ volts, the potential at K can be chosen intermediate between the two voltages for reliable indication of an off-hook condition.

The output signals of operational amplifiers 80 and 81 are passed through isolation diodes 86 and 87 to data bus driver transistor 89, which begins conducting. This places a low level input to buffer 92, which applies a high voltage level signal to data bus lead D2.

The microprocessor, having a look-up table of forbidden numbers or sequences of numbers stored in memory, compares the dialled digits therewith. It should be noted that the digits can be composed merely of the prefix "1", indicating the initiation of a long-distance call, a sequence of digits indicating a forbidden destination, a total number of digits which number indicates desired access to a forbidden destination or trunk, etc. Upon finding a match in its look-up table, the microprocessor addresses a relay which operates contacts 55a and 55b, by applying an address signal to data bus D4–D7, which is decoded in decoder 64, and as described earlier with respect to relay driver 65, causes operation of the relay in relay driver 66 which operates trunk splitting contacts 55a and 55b. Impedance 57 is not now activated.

The trunk being split causes the PT and PR leads now to be connected to the DIVT and DIVR diversion leads. If desired a tone source can be connected to these leads, or a prerecorded message or the like which indicates to the calling subscriber that the trunk has been split and that his call will not be put through.

Relay contacts 55a and 55b are held operated as long as the trunk remains seized. Should the trunk be released, this is detected by the line voltage detector, which changes its signal applied to the D2 data bus lead, resulting in the microprocessor causing release of the relay operating contacts 55a and 55b.

It should be noted that when the trunk is initially seized at the PABX, it should be indicated to the microprocessor that the central office has in fact responded to the seizure of the trunk. While the extension of $-48$ volts and ground on the trunk is an indicator, dial tone is a better indicator, since it signals that the central office is prepared to accept dialled digits. It is preferred that operation of contacts 31a and 31b and application of the tracer signal should not occur until the dial tone from the central office has been received.

In the dial tone detector connected to the COT and COR leads is an A.C. isolated buffer amplifier 125, which applies A.C. signals received from the central office portion of the trunk circuit to the present circuit. The signals are applied through switch 127 and buffer 133 to a dial tone filter 134. Filter 134 can be a standard filter adapted to pass dial tone frequencies.

There are of course many different kinds of signals normally received on the central office portion of the trunk, including voice frequency signals (some of which may be within the frequency band of the dial tone), ringing signals, noise, etc. Therefore it is preferred (but is not essential) to switch the dial tone detector circuit on only after seizure of the PABX portion of the trunk, which establishes the time after which the dial tone signal from the central office may be present and should be detected. Once the trunk has been seized from the PABX, the microprocessor applies a signal on data bus leads D0–D3 which is decoded by decoder 42, and is applied to leads A—A. This is received in inverting AND gate 128, which applies a high level signal to the emitter of transistor 130. This causes the collector to go to high level, enabling switch 127, which preferably is a CMOS switch.

The dial tone on the trunk passes through switch 127, buffer 133, filter 134, and is applied through threshold circuit 135 to buffer 136, and thence to the data bus lead D5. Buffer (tri-state gate) 136 is enabled upon reception of a signal from the microprocessor on the LINE READ lead. Upon reception of dial tone and indication thereof to the microprocessor, the microprocessor shuts off switch 127 by the same method described above.

There are a number of additional circuits which can be associated with the above-described system. Examples of some are detailed below.

The central office will apply ringing voltage to the trunk for an incoming call to the PABX; a ringing voltage detector detects the ringing voltage on the PABX portion of the trunk. Ringing voltage is applied from the PT and PR leads through operational amplifier 73, coupling capacitors 93 and 94 to operational amplifiers 95 and 96. The ringing detection threshold is established by the voltage applied to lead K which is at the junction of resistors 101 and 99. The outputs of operational amplifiers 95 and 96 are applied through isolation diodes 103 and 104 to the input of data bus driver transistor 105. This transistor operates similarly to transistor 89 described earlier, and, upon operating, applies a high level signal to data bus lead D3.

The microprocessor thus receives an indication that a ringing signal has been applied to the trunk. Since this only appears with an incoming call, the later detection of seizure of the trunk upon answering of the call by the PABX operator inhibits the microprocessor from causing operation of relay contacts 31a and 31b, which would otherwise split the trunk and prepare it for reception of a tracer signal. Since the ringing signal precedes the seizure of the trunk, the transmission path is allowed to remain for the duration of the call.

It should be noted that contacts 56a and 56b are normally made such that the trunk path is through to the COT and COR leads. A diode bridge comprising diodes 63a–63d is connected across the COT and COR leads in a polarity direction such that power is provided for photocoupler-operated termination impedance 57. This circuit preferably has a phototransistor input which drives a Darlington transistor pair output having a 310 ohm load. With contacts 56a and 56b in their idle position shown, and with the impedance not activated, virtually no dialing or voice signals are diverted through the diode bridge and load. However, upon splitting of the trunk by operation of contacts 31a and 31b after the trunk has been seized, it must be maintained seized to the central office. Accordingly as described earlier the microprocessor applies a signal addressed to light emitting diode 62, by applying a binary signal to data bus leads D0–D3, which is decoded in decoder 42. The resulting signal is applied to the base of transistor 59, which begins conducting in its emitter-collector circuit. This causes LED 62 to conduct, illuminating it and causing the coupled phototransistor in load 57 to begin conducting. The load thus becomes activated, applying the aforenoted 310 ohm resistor across the central office portion of the trunk, COT and COR. The central office thus detects only the maintenance of a load thereacross, and it maintains the trunk to the PABX.

Certain PABXs seize a trunk by signalling a polarity reversal. This is detected by sensing the D.C. voltage passed through operational amplifier 73 from the PT and PR leads, by operational amplifier 110. The resulting output signal is applied through isolation diode 113 to the base of transistor 115. As described earlier with respect to transistor 89, the input to inverting buffer 118 goes to low level, and a high level signal is applied to data bus lead D4.

Upon detection of a polarity reversal, the microprocessor applies a signal to data bus leads D4–D7 which is decoded in decoder 64, and which operates relay driver circuit 67. A relay coil within relay driver circuit 67 operates as described earlier with reference to driver circuit 65, operating relay contacts 56a and 56b. This effectively connects the PABX portion of the trunk to the diode bridge with opposite polarity, i.e., the ring lead being connected to the positive terminal of the bridge (the anodes of diodes 63a and 63c) and the tip lead to the negative terminal of the bridge. This maintains the direction of power application to the bridge, with the polarity reversal from the PABX.

If the subscribers connected to the PABX dial using multifrequency keyed signals, a circuit is provided to detect multifrequency signals. A receiver and decoder 52 (FIG. 2) is connected across the PR and PT leads. A multifrequency digit receiver and decoder chip is available from a number of Canadian and American manufacturers, although the preferred circuit is described in U.S. Pat. No. 4,273,965, issued June 16, 1981, entitled TONE DECODER, invented by Michael C. J. Cowpland and Patrick R. Beirne. The output of this or similar circuits is a binary signal representing the high tone frequency, which appears on leads H1–H4, and a binary signal representing low tone frequency, which appears on a plurality of leads L1–L4. These two binary signals, a pair representing a dialled digit, are applied to data encoder 53, and the resulting output is applied through buffers 54a–54d to data bus D0–D3. Where there are a plurality of receivers which are used to service a larger number of trunk splitting circuits, the microprocessor can of course keep record of which are currently busy. To allocate a particular idle receiver to receive digits from the trunk, a binary word is applied by the microprocessor to decoder 42 on data leads D0–D3. This signal is applied to a receiver enable circuit 46, which applies an output signal to one of the leads RX1–RX4, one for the enable input of each of, for example, four receivers.

As a variation of the above circuit, the multifrequency digit signal is applied from leads PT and PR to A.C. isolated operational amplifier 47, which applies the resulting signal through receiver enable circuit 46 to the selected receiver. In this case the receiver enable circuit switches the output of operational amplifier 47 to the selected idle receiver input which is connected to one of the leads RX1–RX4.

The above-described circuit thus obtains identification of the line to which trunk restriction may be implemented, determines whether in fact a restriction is applicable, facilitates detection of a dialled destination code, and if the call should be denied, splits the trunk and restricts further access to the central office portion of the trunk by the calling subscriber.

A person understanding this invention may now conceive of other embodiments, improvements, etc., using the same or similar principles. All are believed to be within the sphere and scope of this invention as defined in claims appended hereto.

We claim:

1. A call denial apparatus for use in a telephone system having a plurality of subscribers' lines interconnectable with at least one trunk comprising:
   (a) means for detecting seizure of a trunk,
   (b) means for applying a tracer signal to the trunk upon detection of said seizure,
   (c) means for detecting the tracer signal on one of a plurality of subscribers' lines which have access to the trunk,
   (d) means for storing a representation of at least one predetermined digit,
   (e) means for registering at least one digit dialled over the trunk, and for comparing it with said predetermined digit, and
   (f) means providing a continuous circuit path through the trunk in the event the tracer signal is detected or both the tracer signal is not detected and a correspondence of said dialled digit with said predetermined digit is not found, and for open circuiting the trunk in the event both the tracer signal is not detected and a correspondence of said dialled digit with said predetermined digit is found, whereby said one of the subscribers' lines is denied further access to the trunk.

2. A call denial apparatus as defined in claim 1, in which the means for registering at least one digit dialled over the trunk includes a digit receiver and means for storing representations of a plurality of digits received by said receiver, and further including means for storing representations of predetermined digits, and means for enabling the trunk open circuiting means uponl one or a sequence of representations of the received digits matching one or a sequence of the representations of said predetermined digits.

3. A call denial apparatus for use in a telephone system comprising:
   (a) means for detecting seizure of a trunk,
   (b) means for splitting and terminating the trunk upon detection of the trunk seizure, into an originating portion and a central office portion, and for terminating the trunk portions so as to maintain them in a seized condition,
   (c) signal generator means adapted to apply a brief class of service signal to the originating portion of the trunk when the trunk is split,
   (d) signal detection means for connection to a plurality of subscribers' lines which have access to the trunk, adapted to detect said class of service signal,
   (e) means for detecting dial tone at the central office portion of the trunk,
   (f) means for reconnecting the central office portion from the originating portion of the trunk in the event of no detection of said class of service signal and the detection of subsequently dialled digits corresponding to said one or a sequence of said predetermined digits whereby further access to the central office portion of the trunk from the originating portion is denied, and whereby the trunk is maintained connected in the event of either the class of service signal being received or the detected digits being other than said one or predetermined sequence of digits, thus allowing said digit signals to be transmitted via the central office portion of the trunk.

4. A call denial apparatus as defined in claim 3, in which the means for detecting seizure of a trunk includes a line current detector.

5. Apparatus for detecting that a subscriber's line out of a group of subscribers' lines has accessed a trunk to initiate a call comprising means for detecting seizure of a trunk, a load switchable across the trunk, means for splitting the trunk at a location between the load and the subscriber's line, a tone generator for generating a tracer signal switchable to the trunk leading to the subscriber's line when the trunk is split, means for switching the load across the trunk, splitting the trunk and connecting the tone generator upon detection of seizure of the trunk, means for detecting the tracer signal on at least one of the subscribers' lines of the group, and means for releasing the load, reconnecting the trunk and disconnecting the tone generator upon detection of the tracer signal on said one of the subscribers' lines of the group.

6. Apparatus as defined in claim 5 in which the seizure detecting means is comprised of a dial tone detector.

7. Apparatus as defined in claim 5 further including means for detecting digits dialled from said subscriber's line over the trunk, means for storing a predetermined digit or series of digits, means for comparing the detected digits with said stored digit or series of digits, and means for splitting the trunk in the event of both the detection of the tracer signal and coincidence of the dialled digits and said stored digit or series of digits, whereby further progress of a call over the trunk is inhibited.

8. Apparatus as defined in claim 5 further including means for detecting digits dialled from said subscriber's line over the trunk, means for storing a predetermined digit or series of digits, means for comparing the detected digits with said stored digit or series of digits, and means for splitting the trunk in the event of no detection of the tracer signal and coincidence of the dialled digits and said stored digit or series of digits, whereby further progress of a call over the trunk is inhibited.

9. Apparatus as defined in claim 5 or 8, in which the means for detecting the tracer signal is comprised of a plurality of A.C. coupled input amplifiers, each having its input connected to a subscriber's line, and all having their outputs connected together to the input of a buffer amplifier, the output of the buffer amplifier being connected to the input of a bandpass filter having its center frequency at the frequency of the tracer signal, the output of the filter being connected via an amplifier having a predetermined translation threshold to a data bus lead for indicating the presence of a tracer signal.

10. A method of denying a subscriber's line out of a group of subscribers' lines access to a trunk comprising:
   (a) detecting seizure of the trunk,
   (b) applying a tracer signal to the trunk upon detection of its seizure,
   (c) detecting the tracer signal on a subscriber's line,
   (d) cutting off the application of the tracer signal to the trunk upon detection of the tracer signal on the subscriber's line,
   (e) monitoring the trunk for the presence of destination code digits,
   (f) attempting to match said destination code digits with a predetermined one or plurality of digits, and
   (g) splitting the trunk in the event of the detection of the tracer signal and of the matching of the destination code digits with a predetermined one or plurality of digits, whereby further access to the trunk by the subscriber's line is inhibited.

11. Apparatus for denying a subscriber's line out of a group of subscribers' lines access to a trunk comprising:
   (a) means for detecting seizure of the trunk,
   (b) means for applying a tracer signal to the trunk upon detection of its seizure,
   (c) means for detecting the tracer signal on a subscriber's line,
   (d) means for cutting off the application of the tracer signal to the trunk upon detection of the tracer signal,
   (e) means for monitoring the trunk for the presence of destination code digits,
   (f) means for determining correspondence between predetermined ones of the destination code digits and a predetermined one or a plurality of digits, and
   (g) means for splitting the trunk in the event of no detection of the tracer signal and matching of said predetermined ones of the destination code digits with said predetermined one or plurality of digits, whereby further access to the trunk by the subscriber's line is inhibited.

* * * * *

UNITED STATES PATENT AND TRADEMARK OFFICE
CERTIFICATE OF CORRECTION

PATENT NO. : 4,355,208
DATED : October 19, 1982
INVENTOR(S) : JOHN A. CRIBB, et al.

It is certified that error appears in the above—identified patent and that said Letters Patent is hereby corrected as shown below:

Col. 15, line 22, change "reconnecting" to --disconnecting--.

Col. 15, line 26, delete "said" (both occurrences).

Signed and Sealed this

Seventeenth Day of May 1983

[SEAL]

Attest:

DONALD J. QUIGG

Attesting Officer    Acting Commissioner of Patents and Trademarks